(12) United States Patent
Lin

(10) Patent No.: US 6,774,778 B2
(45) Date of Patent: Aug. 10, 2004

(54) TIRE PRESSURE MONITORING DEVICE AND CODE LEARNING METHOD THEREFOR

(75) Inventor: Sheng Hsiung Lin, Kaohsiung (TW)

(73) Assignee: Lite-on Automotive Corporation (TW)

( * ) Notice: Subject to any disclaimer, the term of this patent is extended or adjusted under 35 U.S.C. 154(b) by 0 days.

(21) Appl. No.: 10/232,693

(22) Filed: Sep. 3, 2002

(65) Prior Publication Data

US 2003/0098787 A1 May 29, 2003

(30) Foreign Application Priority Data

Nov. 29, 2001 (TW) ........................................ 90129767 A

(51) Int. Cl.[7] ............................................. B60C 23/00
(52) U.S. Cl. ............. 340/447; 340/825.49; 340/870.28; 340/539.21; 342/42; 342/50; 701/70; 73/146.4; 307/9.1
(58) Field of Search ....................... 340/825.49, 870.28, 340/539.214, 447; 342/42, 50; 307/9.1, 125, 129; 701/70; 73/146.4

(56) References Cited

U.S. PATENT DOCUMENTS

| | | | |
|---|---|---|---|
| 5,710,539 A | * 1/1998 | Iida | 340/444 |
| 5,808,190 A | * 9/1998 | Ernst | 73/146.5 |
| 5,852,409 A | * 12/1998 | Bell | 340/870.02 |
| 6,087,930 A | * 7/2000 | Kulka et al. | 340/447 |
| 6,259,361 B1 | 7/2001 | Robillard et al. | 340/447 |
| 6,278,363 B1 | * 8/2001 | Bezek et al. | 340/442 |

OTHER PUBLICATIONS

Taiwanese Application No. 089117036 corresponding to U.S. application No. 09/910,725.

Taiwanese Application No. 090112305 corresponding to U.S. application No. 10/144,852.

* cited by examiner

Primary Examiner—Daniel J. Wu
Assistant Examiner—Samuel J. Walk

(57) ABSTRACT

A tire pressure monitoring device, being installed in a motor vehicle having a plurality of tires, includes: a plurality of sensor modules being installed onto the tire and having a wireless communication signal transmitter for transmitting a radio frequency (RF) signal. The RF signal includes a specific code for the status of the tire and a specific code for the sensor module. The device further includes a plurality of antenna modules, each being installed individually for one of the sensor modules for receiving the signal; and a receiving device, electrically coupled to the antenna module for processing the signal.

16 Claims, 2 Drawing Sheets

TIRE PRESSURE MONITORING DEVICE AND CODE LEARNING METHOD THEREFOR

BACKGROUND OF THE INVENTION

1. Field of the Invention

The present invention relates to a tire pressure monitoring device, more particularly to a tire pressure monitoring device for monitoring the condition inside a tire and having a simplified code learning process.

2. Description of Related Art

Related technologies and devices for confirming the relative position between the tire pressure monitor and the tire have been widely used in the prior arts. For example, the present inventor has filed a R.O.C. Patent Application No. 089117036 entitled "Method and Apparatus for Monitoring Inflated Tire" on Aug. 22, 2000, now abandoned, discloses that such device having a sensor module installed in each of the inflated tires for sensing the conditions of the tires and after the conditions of the tires are coded, they are transmitted by radio frequency signals, and a decoder module comprising a radio frequency antenna module for receiving the radio frequency signals transmitted by the sensor module; a memory for recording the data for the conditions of the tires in a predetermined range and the monitoring data of the conditions of the tire; a processor for decoding the received radio signals and comparing the data in the memory to determine the application condition of the inflated tires; and a buzzer for monitoring the abnormal situation of pressure and temperature of the individual tire and identifying the individual tire to confirm the tire of which the abnormal situation has occurred.

However, when the prior art is performing coding confirmation within the decoder module and the sensor module in each of the inflated tires, the user has to release the air in each inflated tire of the motor vehicle, making use of the rapid change of the pressure in the tire to continually transmit signals by the sensor module inside the tire. After confirmed by the decoder module, it is confirmed that the relative position of the tire of which such sensor module is installed. Then, such tire has to be inflated again before the motor vehicle can be operated again. Obviously, such process is relatively time consuming, inconvenient, and complicated.

The present inventor has filed a Patent Application No. 090112305 entitled "Code Learning Device of Tire Pressure Monitor" on May 17, 2001, and has disclosed a code learning device of the tire pressure monitor and the handheld code learning device. However the foregoing code learning device needs additional device and operation before such code learning process can be accomplished. As to the driver, such code learning process is complicated and redundant, and the situation of changing tire does not occur that often, therefore the user probably forget how to operate the code learning process when it is needed.

Further, the U.S. Pat. No. 6,259,361 entitled "Tire Monitoring System" issued to Robillard, et al on Jul. 10, 2001, has disclosed a system using the temperature and accelerator to respectively identify the front tire and the rear tire and confirm the position of tires. However, although the front tire is closer to the engine and is for driving the car, and thus has a higher temperature than that of the rear tire, such temperature difference are often affected by the external temperature so that correct result cannot be obtained.

Therefore, the foregoing code learning method is unable to provide a fast and effective code learning module for the tire monitor decoder module inside the motor vehicle to define the specific code for each inflated tire. It is necessary to provide a code learning method and apparatus to monitor the tire pressure that makes the code learning process for the tire pressure monitoring device simpler and faster.

SUMMARY OF THE INVENTION

The primary objective of the present invention is to provide a tire monitoring device for monitoring the conditions of the tires, and such device can easily identify the tire position of the installed tire pressure monitoring device.

The secondary objective of the present invention is to provide a code learning method for the tire monitoring device to the user to confirm the tire position of the installed tire pressure monitoring device without going through the complicated operation.

In order to accomplish the aforementioned objective, the present invention provides a tire monitoring device being installed to a motor vehicle having a plurality of tires, and comprising: a plurality of sensor modules being installed onto the tire and having a wireless communication signal transmitter for transmitting a radio frequency (RF) signal, and such RF signal further comprising a status of the tire and a specific code of the sensor module; a plurality of antenna modules, each being installed to almost each of the plurality of the sensor modules for receiving such RF signal; and a receiving device, electrically coupled to the antenna module for processing such RF signal.

According to another viewpoint of the tire monitoring device of the present invention, the receiving device further comprises: an electronic switch module for selectively connecting to the plurality of antenna modules; a RF receiver connected to the electronic switch module for dividing the RF signal of such antenna module into a data signal and an amplitude signal; a central processing unit coupled to the RF receiver for controlling the electronic switch module; and a monitor.

The present invention also provides a tire pressure monitoring device and its code learning method, comprising the steps of: providing a plurality of sensor modules, being installed to a plurality of tires in a motor vehicle, each having a wireless signal transmitter for sending a signal, and such signal further comprising a specific code for the conditions of the tire and a specific code for the sensor module; a plurality of antenna modules, each being installed individually to each of the sensor modules.

Since the tire monitoring device of the present invention does not need complicated code learning process to identify the RF signal transmitted from each tire, therefore users can easily complete the code learning operation after replacing the tire.

To make it easier for our examiner to understand the aforementioned and other objectives, innovative features, and advantages of the present invention, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
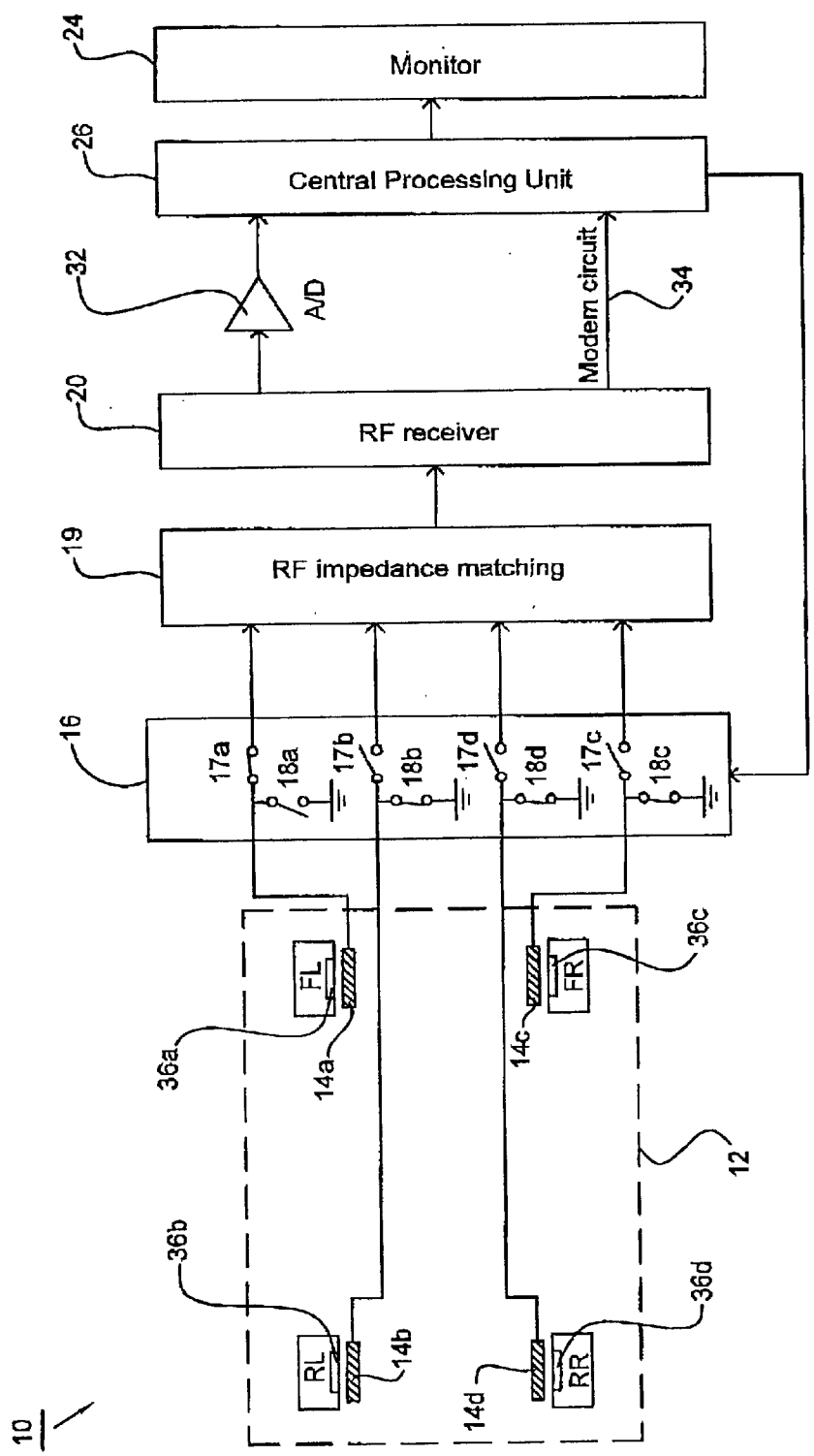
FIG. 1 is a block diagram of the tire monitoring device according to a preferred embodiment of the present invention.

Please refer to FIG. 1 for the block diagram of the tire monitoring device 10 according to the present invention. The tire monitoring device 10 further comprises 4 sensor modules 36a, 36b, 36c, 36d, each being installed to the front left (FL) wheel, rear left (RL) wheel, front right (FR) wheel, and rear right (RR) wheel of the motor vehicle. Each sensor module has a sensor application-specific integrated circuit (ASIC) and a radio frequency (RF) transmitter. The sensor module installed to individual inflated tire is used to detect the conditions of the tire, and after coding the detected tire condition, the code is sent out in RF signal. Such ASIC sensor will send out the wireless signal to the transmitter about every minute, and send the data of the current tire conditions such as the data of tire pressure, temperature, and acceleration in terms of RF signal. Such sensor module can be seen in the R.O.C. Patent Filing No. 089117036, entitled "Method and Apparatus for Measuring Tire Pressure of Inflated Tire" filed on Aug. 22, 2000 by the present inventor, and such patent application has been attached to this specification for reference.

The tire monitoring device 10 comprises four antenna module 14a, 14b, 14c, 14d, each being disposed at a position next to the front left (FL), rear left (RL), front right (FR), and rear right (RR) wheels of the motor vehicle. The signal received by the four antenna modules 14a, 14b, 14c, 14d will enter into an electronic switch module 16, and such electronic switch module 16 has 4 signal switches 17a, 17b, 17c, 17d, each is used to control the electric connection from the antenna modules 14a, 14b, 14c, 14d to a RF impedance matching 19, and each of the four ground-switches 18a, 18b, 18c, 18d is used to control the grounding for the antenna modules 14a, 14b, 14c, 14d. The impedance matching 19 is connected to the RF receiver 20, and connected to a central processing unit 26 through an analog/digital converter 32 and a modem circuit 34. The central processing unit 26 can control a monitor 64 and the electronic switch module 16.

The signal of the tire condition data transmitted by the ASIC sensor through the wireless signal transmitter also includes a specific code of the ASIC sensor. Therefore, when the tire is under monitoring, the central processing unit 26 will connect the four signal switches 17a, 17b, 17c, 17d of the electronic switch module 16, and the four ground switches 18a, 18b, 18c, 18d are disconnected, such that the antenna modules 14a, 14b, 14c, 14d can be electrically connected to the RF impedance matching 19. Although the tire monitoring device 10 has RF signals transmitted from the four sensor modules 36a, 36b, 36c, 36d, the sensor module generally transmit the signal about once per minute. Therefore the RF impedance matching 19 bases on the received signal to generate a signal alternation to the RF receiver 20.

The RF receiver 20 will divide the received RF signal into data signal and amplitude signal. The data signal includes the tire conditions such as temperature and pressure detected by the sensor modules and the specific code of the senor module of the tire. The data signal and the amplitude signal will be sent to the central processing unit 26 through the analog/digital converter 32 and the modem circuit 34 respectively. Thereafter, the central processing unit 26 will identify the tire, which sends such signal by the specific code of the sensor module of the tire, and control the monitor to display the tire conditions of the motor vehicle 12.

As described above, before the tire monitoring device 10 is used for the monitoring operation, it has to go through the code learning process. In the code learning process as illustrated in the figure, the central processing unit 26 controls to connect the signal switch 17a first and disconnect the rest of the signal switches 17b, 17c, 17d and the ground switch 18a, and ground the rest of the ground switches 18b, 18c, 18d, such that only the signal received by antenna module 14a will enter into the RF impedance matching 19, the RF receiver 20, and the central processing unit 26. The central processing unit 26 will compare the amplitude signal inputted by the RF receiver 20. If the amplitude is larger than a predetermined value, then such signal is determined as the one transmitted from the sensor module 36a in the front left wheel. Alternatively, in another embodiment, the central processing unit 26 will compare the amplitude signal inputted from the RF receiver 20 and select the one with the largest value to determine whether or not the signal is transmitted from the sensor module 36a in the front left wheel. Therefore the central processing unit 26 can individually memorize the specific codes of the sensor modules 36a, 36b, 36c, 36d, and the position of the installed tire, such that when the tire is monitored, the specific code can determine which tire transmits the signal.

Those skilled in the arts can understand that the amplitude of the RF signal is inversely proportional to the cube of the distance. Therefore, the antenna module 14a will receive the signal transmitted from the sensor modules 36a, 36b, 36c, 36d, but the amplitude of the signal transmitted from the sensor module 36a is substantially larger than those from the other three wireless signals transmitted by the rest of the sensor modules 36b, 36c, 36d. Therefore, if the amplitude is larger than a predetermined value and/or the maximum, it can be sure that the received signal comes from the sensor module 36a corresponsive to the antenna 14a, and also can confirm the corresponding position and the specific code of the sensor module 36a. Similarly, the signals from the rest of the sensor modules 36b, 36c, 36d are received and the specific codes from the antenna modules 14b, 14c, 14d can be identified respectively.

Further, after a motor vehicle having 4 wheels installed and gone through with the code learning process, the central processing unit 26 can individually memorize the specific code of the sensor modules 36a, 36b, 36c, 36d, and the position of the installed tire. If the user has changed the position of the tire (such as the tire rotation from the front to the rear), since the specific codes of the sensor modules 36a, 36b, 36c, 36d of the four tires have been memorized, therefore the central processing unit 26 compares the memorized specific code and the specific code of the received signal to eliminate the cross talk from other motor vehicle, and further identify the tire position with the installation of such sensor module, and then completes the automatic locating procedure.

Further, those skills in the art also know that the electronic switch module 16 has four signal switches 17a, 17b, 17c, 17d, which can individually connect the antenna modules 14a, 14b, 14c, 14d to the RF impedance matching 19. At the same time, providing four ground switches 18a, 18b, 18c, 18d and working together with the four signal switches 17a, 17b, 17c, 17d to further avoid the cross talk between signals.

Figure 2:
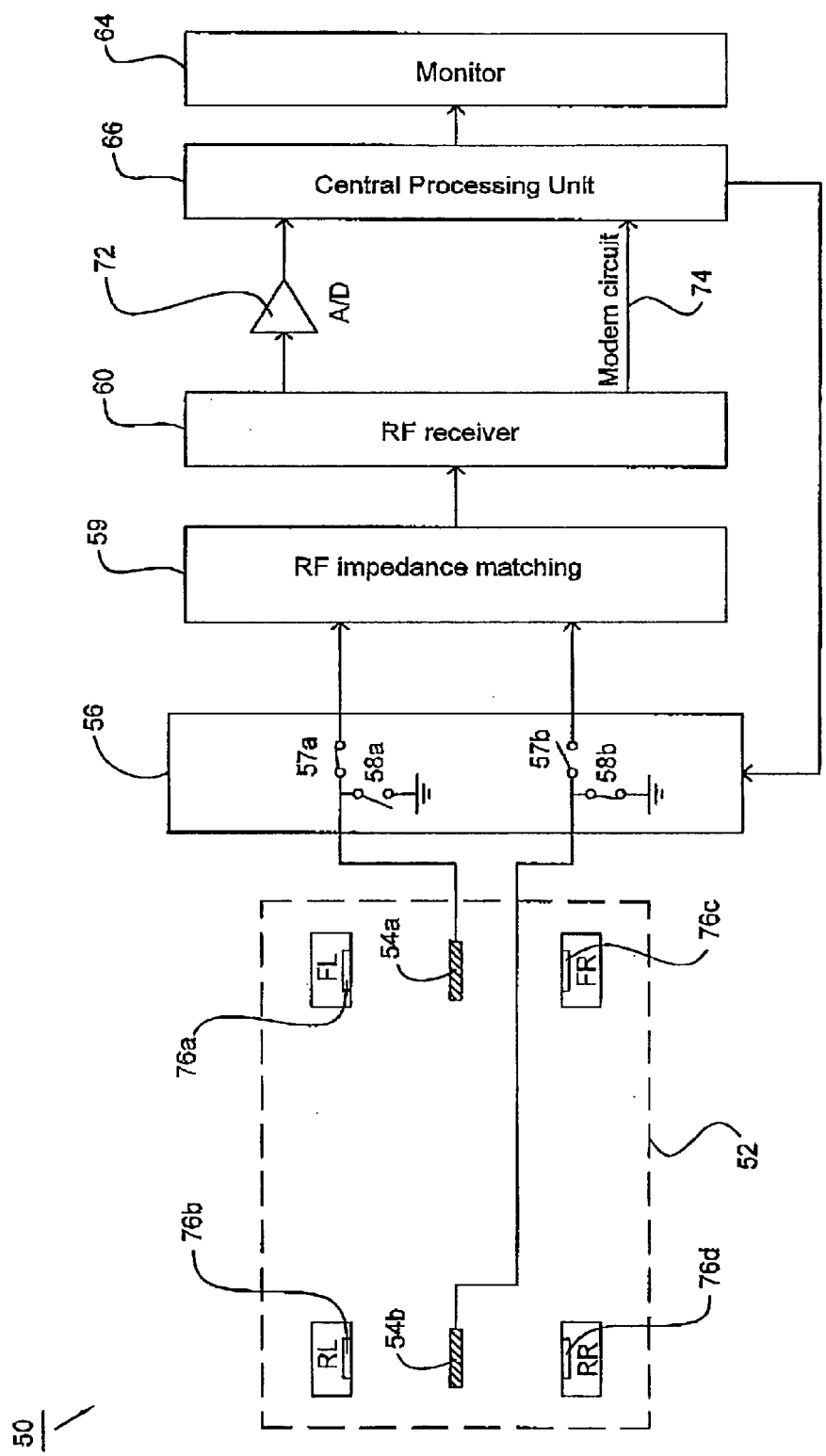
FIG. 2 is a block diagram of the tire monitoring device according to another preferred embodiment of the present invention

Please refer to FIG. 2 for the block diagram of the tire monitoring device 50 according to another preferred embodiment of the present invention. The tire monitoring device 50 is very similar to the tire monitoring device 10 according to the present invention and labeled with similar number in the figure. The tire monitoring device 50 is substantially the same as the tire monitoring device 10, and their difference relies on the tire monitoring device 50 having two antenna modules 54a, 54b, individually installed in the front end and at the rear end of the motor vehicle 52. The ASIC sensor of the sensor module 76a, 76b, 76c, 76d of the tire monitoring device 50 is used to detect the tire conditions, and the tire conditions at least include the data of pressure, temperature, and acceleration.

Similarly, during the detection process, the tire monitoring device 50 receives the RF signal transmitted from the sensor module through the two antenna modules 54a, 54b, and the RF signal includes the tire conditions of individual tire. In the code learning process, as illustrated in FIG. 2, the central processing unit 66 controls to connect the signal switch 57a and disconnect the signal switch 57b and the ground switch 58b, such that only the signal received from the antenna module 54a will enter into the RF impedance matching 59, the RF receiver, and the central processing unit 60. The central processing unit 66 will compare the amplitude signal inputted from the RF receiver 60; if the value of the amplitude is larger than a predetermined value, then such signal is determined as the one coming from the sensor modules 76a, 76c in the front left wheel or the front right wheel. Further, the ASIC in the sensor modules 76a, 76b, 76c, 76d can detect the acceleration in the tire. As it is known that the acceleration is directional. If tire on the left tire is accelerated while the motor vehicle is moving forward, the tire on the right is retarded. Therefore, the acceleration and retardation of the tire can determine the signal coming from the front left tire or the front right tire. Similar method is used to determine the signals transmitted from other tires in the motor vehicle. Further, it the motor vehicle has a spare tire, and another set of sensor module. Since its acceleration is zero, therefore the signal coming from the spare tire can also be determined.

In view of the above description, the tire monitoring device of the present invention does not require a complicated code learning process to identify the transmitted RF signal coming from which tire, therefore after the user has changed tires, no additional device or complicated procedure are needed in order to complete the code learning operation easily.

While the present invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A code learning method for a tire monitoring device, said method comprising the steps of:
   providing a plurality of sensor modules being installed to a plurality of tires in a motor vehicle, each sensor module having a wireless signal transmitter for transmitting a signal, said signal including a specific code for a tire condition and a specific code for the sensor module;
   providing a plurality of antenna modules, each being installed to individual sensor module, for receiving the signal;
   selectively coupling the plurality of antenna modules;
   dividing the signal into a data signal and an amplitude signal;
   confirming an intensity of the amplitude signal to locate the installed position and the specific code of the sensor module from which the signal is being transmitted.

2. A code learning method for tire monitoring device as claimed in claim 1, further comprising the steps:
   providing a memory for memorizing the specific codes of the plurality of sensor modules; and
   comparing the specific codes in the memory and the specific code transmitted from the sensor module.

3. A code learning method for tire monitoring device as claimed in claim 1, wherein said step of confirming the installed location of the sensor module further comprising the steps of:
   confirming the installed location and the specific code of the sensor module from which the signal is being transmitted, if the intensity is larger than a predetermined value.

4. A code learning method for tire monitoring device as claimed in claim 1, wherein said signal is a radio frequency (RF) signal.

5. A code learning method for tire monitoring device as claimed in claim 1, wherein said tire condition is selected from the group consisting of pressure, temperature, acceleration, and combinations thereof.

6. A code learning method for tire monitoring device, said method comprising the steps of:
   providing a plurality of sensor modules being installed to a plurality of tires in a motor vehicle, each sensor module having a wireless signal transmitter for transmitting a signal, said signal including a specific code for a tire condition and a specific code for the sensor module;
   providing two antenna modules, installed in a front end and a rear end of the motor vehicle, respectively, for receiving the signal;
   selectively coupling the antenna modules;
   dividing the signal into a data signal and an amplitude signal;
   determining a tire acceleration value from the signal;
   determining whether the sensor module that transmits the signal is installed in the front end or the rear end of the motor vehicle, based on an intensity of the amplitude signal; and
   determining whether the sensor module that transmits the signal is installed on the left or on the right of the motor vehicle, based on the tire acceleration value, thereby identifying the installed position and the specific code of the sensor module that transmits the signal.

7. A code learning method for tire monitoring device as claimed in claim 6, further comprising the steps of:
   providing a memory for memorizing the specific codes of the plurality of sensor modules; and
   comparing the specific codes in the memory and the specific code transmitted from the sensor module.

8. A code learning method for tire monitoring device as claimed in claim 6, wherein said tire condition is selected from the group consisting of pressure, temperature, acceleration, and combinations thereof.

9. A tire monitoring device for use in a motor vehicle having a plurality of tires, said device comprising:
   a plurality of sensor modules, each being installed in one of the tires and having a wireless signal transmitter for transmitting a signal, said signal comprising a specific code indicative of a condition of the tire and a specific code indicative of the sensor module;

a plurality of antenna modules, each for receiving the signal from one of said sensor modules; and a receiving device, electrically coupled to the antenna modules, for processing the signal, wherein said receiving device comprises:
   an electronic switch module selectively coupled to the antenna modules;
   a radio frequency receiver coupled to the electronic switch module for dividing the signal into a data signal and an amplitude signal; and
   a central processing unit coupled to the radio frequency receiver for controlling the electronic switch module.

10. A tire monitoring device as claimed in claim 9, wherein said signal is a radio frequency (RF) signal.

11. A tire monitoring device as claimed in claim 9, wherein said condition is selected from the group consisting of pressure, temperature, acceleration, and combinations thereof.

12. A tire monitoring device as claimed in claim 10, wherein said receiving device further comprises a monitor controlled by said central processing unit.

13. A tire monitoring device for use in a motor vehicle having a plurality of tires, said device comprising:

a plurality of sensor modules each being installed in one of the tires and having a wireless signal transmitter for transmitting a signal, said signal comprising a specific code indicative of a condition of the tire and a specific code indicative of the sensor module;

two antenna modules, separately installed in a front end and a rear end of the motor vehicle, respectively, for receiving the signal; and a receiving device, electrically coupled to the antenna modules, for processing the signal, wherein said receiving device comprises:
   an electronic switch module selectively coupled to the antenna modules;
   a radio frequency receiver coupled to the electronic switch module for dividing the signal into a data signal and an amplitude signal; and
   a central processing unit coupled to the radio frequency receiver for controlling the electronic switch module.

14. A tire monitoring device as claimed in claim 13, wherein said signal is a radio frequency (RF) signal.

15. A tire monitoring device as claimed in claim 13, wherein said condition is selected from the group consisting of pressure, temperature, acceleration, and combinations thereof.

16. A tire monitoring device as claimed in claim 15, wherein said receiving device further comprises a monitor controlled by said central processing unit.

* * * * *